(12) United States Patent
Endo et al.

(10) Patent No.: US 8,872,425 B2
(45) Date of Patent: Oct. 28, 2014

(54) LIGHT DISTRIBUTION CONTROL SYSTEM FOR VEHICLE

(75) Inventors: Osamu Endo, Shizuoka (JP); Naoki Tatara, Shizuoka (JP)

(73) Assignee: Koito Manufacturing Co., Ltd. (JP)

( * ) Notice: Subject to any disclaimer, the term of this patent is extended or adjusted under 35 U.S.C. 154(b) by 164 days.

(21) Appl. No.: 13/608,038

(22) Filed: Sep. 10, 2012

(65) Prior Publication Data

US 2013/0076240 A1 Mar. 28, 2013

(30) Foreign Application Priority Data

Sep. 26, 2011 (JP) ................................. 2011-209029

(51) Int. Cl.
*B60Q 1/04* (2006.01)
*B60Q 1/16* (2006.01)
*B60Q 1/00* (2006.01)
*B60Q 1/08* (2006.01)

(52) U.S. Cl.
CPC .......... *B60Q 1/0023* (2013.01); *B60Q 2300/41* (2013.01); *B60Q 2300/32* (2013.01); *B60Q 2300/42* (2013.01); *B60Q 1/085* (2013.01); *B60Q 2300/336* (2013.01); *B60Q 2300/332* (2013.01)
USPC .............. 315/82; 362/465; 362/466; 362/276

(58) Field of Classification Search
USPC ..................... 315/82; 362/464, 465, 466, 276
See application file for complete search history.

(56) References Cited

U.S. PATENT DOCUMENTS

| | | | | |
|---|---|---|---|---|
| 6,481,876 B2 * | 11/2002 | Hayami et al. | ................ | 362/464 |
| 7,210,828 B2 * | 5/2007 | Fukawa et al. | ................ | 362/465 |
| 7,241,028 B2 * | 7/2007 | Hasumi | ........................ | 362/276 |
| 7,390,112 B2 * | 6/2008 | Leleve | .......................... | 362/464 |
| 7,699,509 B2 * | 4/2010 | Leleve | .......................... | 362/464 |
| 2003/0031008 A1 * | 2/2003 | Kobayashi | ...................... | 362/37 |

FOREIGN PATENT DOCUMENTS

| | | |
|---|---|---|
| JP | 2005119661 | 5/2005 |
| JP | 2009218155 | 9/2009 |

* cited by examiner

*Primary Examiner* — Daniel D Chang
(74) *Attorney, Agent, or Firm* — Cantor Colburn LLP

(57) ABSTRACT

Provided is a light distribution control system for vehicle in which each of left and right head lamp housings is provided with camera that picks up image of the forward area of vehicle, main lamp unit that forms basic light distribution pattern which is symmetric at the forward area of the vehicle, first sub lamp unit that forms first additional light distribution pattern at lateral side of the vehicle as compared to the basic light distribution pattern, second sub lamp unit that forms second additional light distribution pattern at lateral side of the vehicle, and control unit that controls the turning-ON/OFF of the first and second sub lamp units based on the image data of the camera. The control unit may form non-symmetric light distribution pattern as a whole at the forward area of the vehicle according to road environment.

9 Claims, 10 Drawing Sheets

LIGHT DISTRIBUTION CONTROL SYSTEM FOR VEHICLE

CROSS-REFERENCE TO RELATED APPLICATIONS

This application is based on and claims priority from Japanese Patent Application No. 2011-209029, filed on Sep. 26, 2011, with the Japanese Patent Office, the disclosure of which is incorporated herein in its entirety by reference.

TECHNICAL FIELD

The present disclosure relates to a light distribution control system for a vehicle which controls a light distribution of a head lamp based on an image data of a camera.

BACKGROUND

A light distribution of a head lamp for a vehicle in the related art is based on a pattern formed by a low-beam and a high-beam. A variable light distribution system for a vehicle is also known, in which a light distribution pattern of a head lamp of a vehicle is changed by imaging the forward area of the vehicle using a camera and driving an optical component such as, for example, a shade or a reflector based on the image data of the camera.

For example, Japanese Patent Application Laid-Open No. 2009-218155 discloses a technology in which an additional light distribution pattern is formed above a cut-off line by further providing a light source in a head lamp to increase the functionality of a low-beam. Japanese Patent Application Laid-Open No. 2005-119661 discloses a technology in which a plurality of light distribution control lamps and motors are provided, and the irradiation ranges of the light distribution control lamps are changed by controlling the motors based on the image data of a camera.

SUMMARY

The conventional light distribution pattern based on a low-beam and a high-beam has a problem that cannot respond sufficiently to a recent road environment. For example, as illustrated in FIG. 8A, a light distribution pattern P51 formed by a low-beam of a vehicle V1 causes a glare to a preceding vehicle V2 on a left lane while the vehicle V1 drives on a right lane. In a left-curved road as illustrated in FIG. 8B, the light distribution pattern P51 of the vehicle V1 driving on an inner side causes a glare to an opposing vehicle V2 on an outer side.

Meanwhile, while a vehicle that runs on a road with heavy traffic or a bright town even at night does not need a light distribution pattern that irradiates far away, the lamp unit for a high-beam still occupies a substantial space. The conventional variable light distribution system has a problem that needs an actuator such as a motor to change the light distribution pattern of a head lamp, and as a result, the mechanism and the control thereof become complicated.

Therefore, an object of the present disclosure is to provide a light distribution control system for a vehicle capable of irradiating a light of necessary amount at a necessary time to a necessary place with a simple configuration.

In order to solve the aforementioned problems, the present disclosure provides a light distribution control system for a vehicle as below:

(1) A light distribution control system for a vehicle, which includes a pair of head lamps disposed at a left side and a right side of a vehicle and configured to illuminate a forward area of the vehicle, a camera configured to pick up an image of the forward area of the vehicle, and a control unit that controls the light distributions of the head lamps based on the image data of the camera. Each of the head lamps disposed at the left side and the right side of the vehicle is provided with a main lamp unit that forms a symmetrically shaped left and right basic light distribution pattern at the forward area of the vehicle and a sub lamp unit that forms an additional light distribution pattern at a lateral side of the vehicle as compared to the basic light distribution pattern, and the control unit controls the light output (the turning-ON/OFF and/or the light amount) of the sub lamp units disposed at the left side and the right side of the vehicle separately based on the image data of the camera.

(2) The light distribution control system for a vehicle disclosed in (1), in which the main lamp unit forms the symmetrically shaped left and right basic light distribution pattern at a lower side than a horizontal line of the forward area of the vehicle.

(3) The light distribution control system for a vehicle disclosed in (1) or (2), in which the camera includes a left camera that picks up an image of the left side of the forward area of the vehicle and a right camera that picks up an image of the right side of the forward area of the vehicle.

(4) The light distribution control system for a vehicle disclosed in (3), in which the left camera is provided inside a housing for the head lamp disposed at the left side of the vehicle and the right camera is provided inside a housing for the head lamp disposed at the right side of the vehicle.

(5) The light distribution control system for a vehicle disclosed in (4), in which the control unit includes a left control unit that controls the sub lamp unit disposed at the left side of the vehicle based on the image data of the left camera and a right control unit that controls the sub lamp unit disposed at the right side of the vehicle based on the image data of the right camera, and each of the left and right control units is provided inside the housings for the head lamps disposed at the left side and the right side of the vehicle, respectively.

According to the light distribution control system of the present disclosure, since the light outputs from the left and right sub lamp units are separately controlled based on the image data of the camera, the system is capable of forming a non-symmetric light distribution pattern as well as a symmetric light distribution pattern as a whole by combining additional light distribution pattern at a lateral side of the basic light distribution pattern in the forward area of the vehicle, and capable of illuminating a light of necessary amount at a necessary time to a necessary place, with a simple configuration where an actuator is not needed. There is an advantage that the additional light distribution pattern may be more precisely formed by separately providing the left and right cameras and the left and right control units inside the left and right head lamps, respectively.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which form a part hereof The illustrative embodiments described in the detailed description, drawing, and claims are not meant to be limiting. Other embodiments may be utilized, and other changes may be made, without departing from the spirit or scope of the subject matter presented here.

Figure 1:
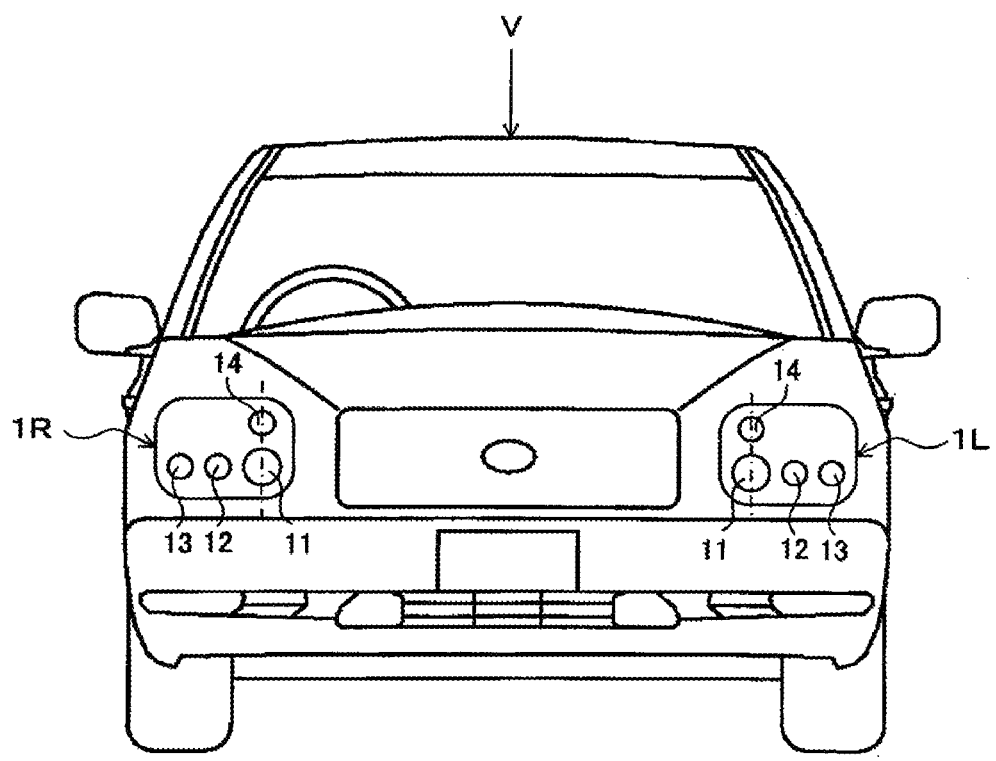
FIG. 1 is a front view of a vehicle including head lamps used for a light distribution control system of an exemplary embodiment of the present disclosure.

Hereinafter, exemplary embodiments of the present disclosure will be described with reference to the drawings. A vehicle V illustrated in FIG. 1 is equipped with a right head lamp 1R and a left head lamp 1L when viewed from a driver. Each of the head lamps 1R, 1L is provided with a main lamp unit 11, two sub lamp units 12, 13, and a camera 14. The camera 14 is provided in the same position (a chain line position) to the main lamp unit 11 in a horizontal direction, and picks up an image of a forward area of the vehicle at an upper side of the main lamp unit 11.

Figure 2:
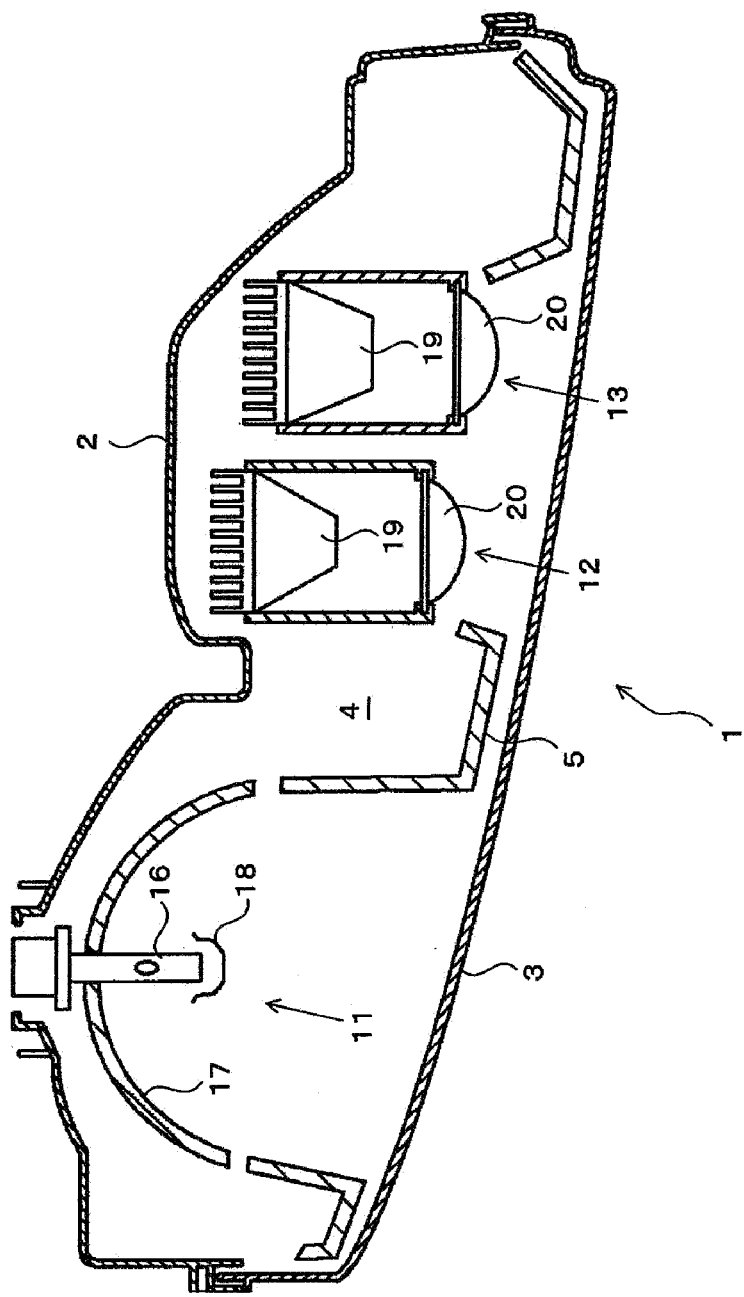
FIG. 2 is a transverse sectional-cross view illustrating internal mechanisms of a head lamp.

As illustrated in FIG. 2, a lamp chamber 4 is formed between a housing 2 for a head lamp and a front cover 3, and the main lamp unit 11 is provided at an inner position in a vehicle width direction in the lamp chamber 4. The sub lamp units 12, 13 are also provided at an outer position in the vehicle width direction, and an extension 5 is provided in a gap portion. The main lamp unit 11 includes a bulb light source 16, a reflector 17 and a shade 18, and the both sub lamp unit 12, 13 include a LED light source 19 and a projection lens 20.

Figure 3:
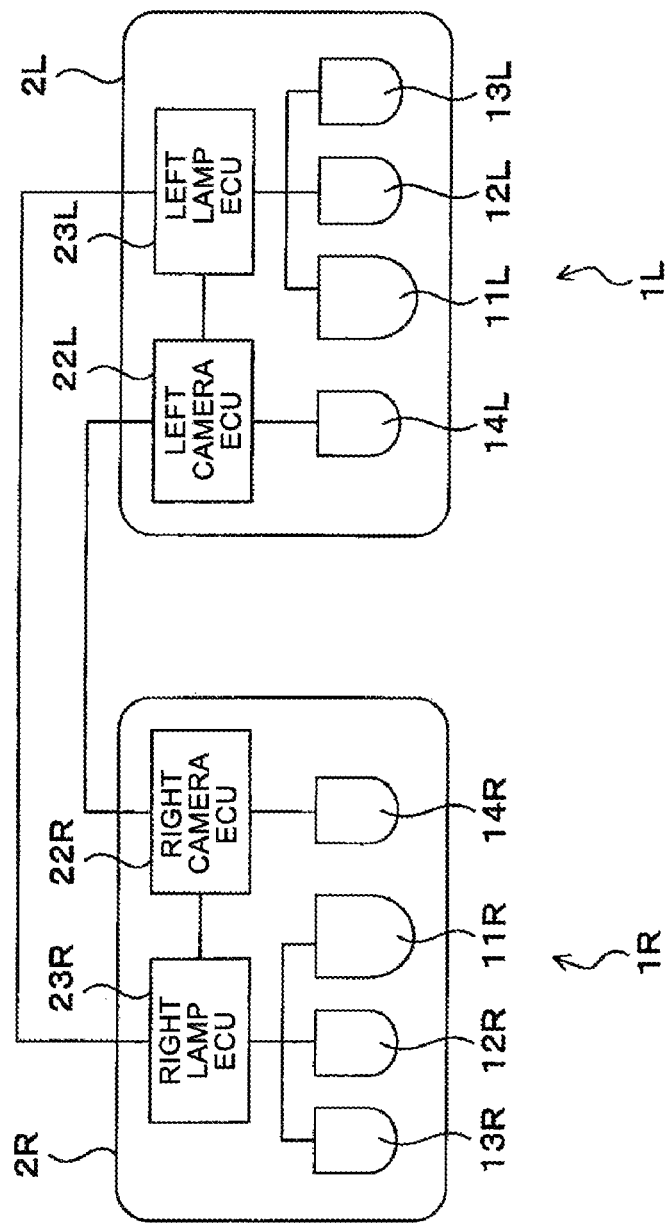
FIG. 3 is a block diagram illustrating an electrical circuit of the head lamp.

As illustrated in FIG. 3, a housing 2R of the right head lamp 1R is provided with a right camera electronic control unit (ECU) 22R that processes the image data of a right area of the forward area of the vehicle obtained by the right camera 14R, and a right lamp electronic control unit (ECU) 23R that controls the turning-ON/OFF (light output) of the right lamp units 11R, 12R, 13R based on the image data of the right camera 14R. Likewise, a housing 2L of the left head lamp 1L is provided with a left camera ECU 22L that processes the image data of a left area obtained by the left camera 14L, and a left lamp ECU 23L that controls the turning-ON/OFF of the left lamp units 11L, 12L, 13L based on the image data of the left camera 14L.

Figure 4A:
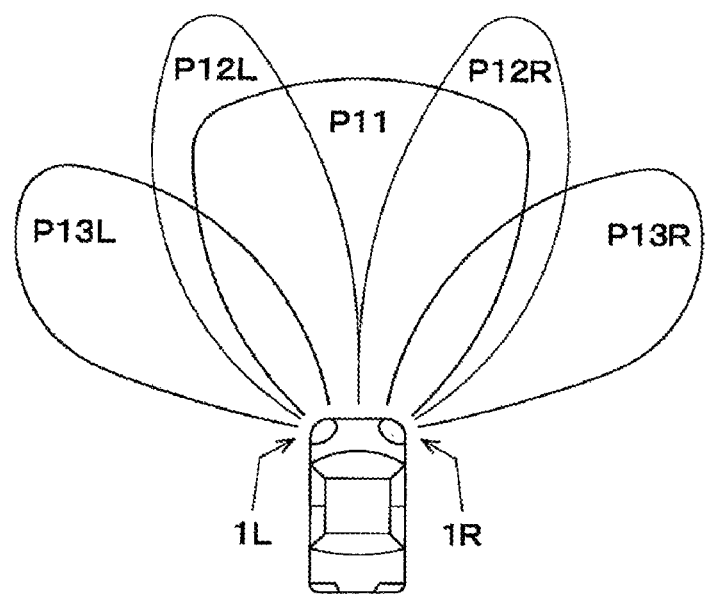
FIGS. 4A and 4B each schematically illustrates a basic light distribution pattern and an additional light distribution pattern of the head lamps.
Figure 4B:
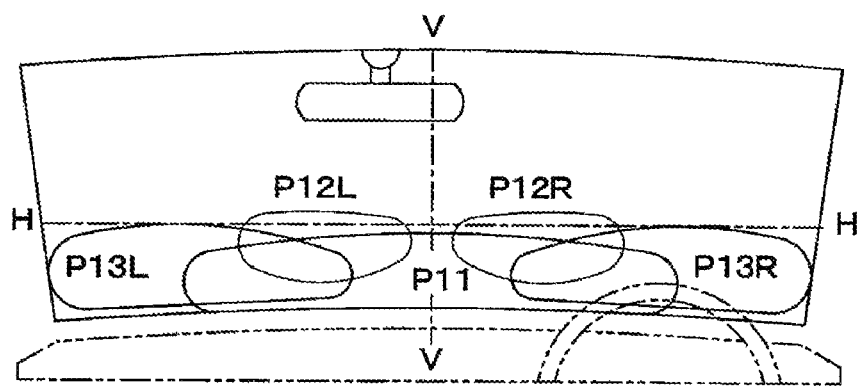

As illustrated in FIGS. 4A and 4B, the light distribution pattern of the head lamps 1L, 1R includes a basic light distribution pattern P11 formed by the left and right main lamp units 11R, 11L, a first additional light distribution pattern P12R of the right side formed by the first sub lamp unit 12R of the right side, a second additional light distribution pattern P13R of the right side formed by the second sub lamp unit 13R of the right side, a first additional light distribution pattern P12L of the left side formed by the first sub lamp unit 12L of the left side, and a second additional light distribution pattern P13L of the left side formed by the second sub lamp unit 13L of the left side.

Figure 5A:
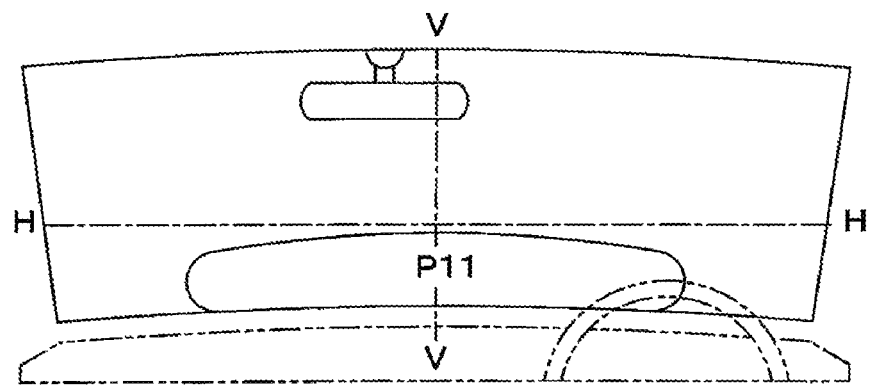
FIGS. 5A and 5B each schematically illustrates an operation of the basic light distribution pattern.
Figure 5B:
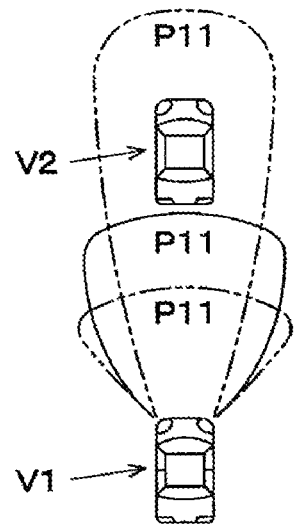

As illustrated in FIG. 5A, the basic light distribution pattern P11 is formed in a shape where the pattern is symmetric in a lower area than a horizontal line H-H of the forward area of the vehicle, and illuminates the central area in the horizontal direction of the forward area of the vehicle. As illustrated in FIG. 5B, the shade 18 of the main lamp unit 11 may be configured such that the shade 18 is operated based on the image data of the camera 14, in order to stretch the basic light distribution pattern P11 according to a preceding vehicle V2.

Figure 6A:
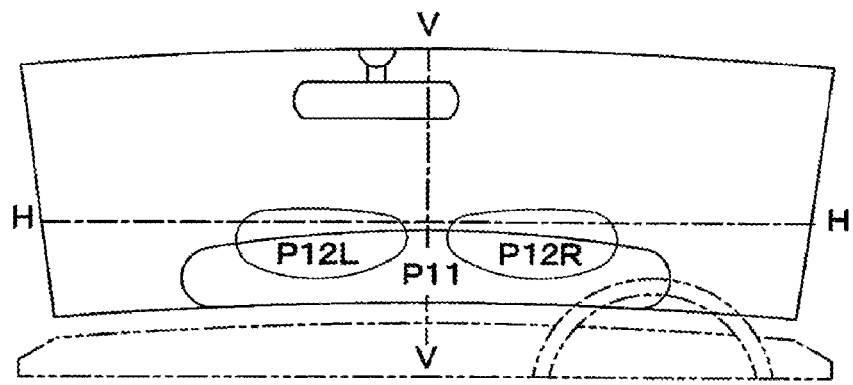
FIGS. 6A to 6E each schematically illustrates an operation of a first additional light distribution pattern.
Figure 6B:
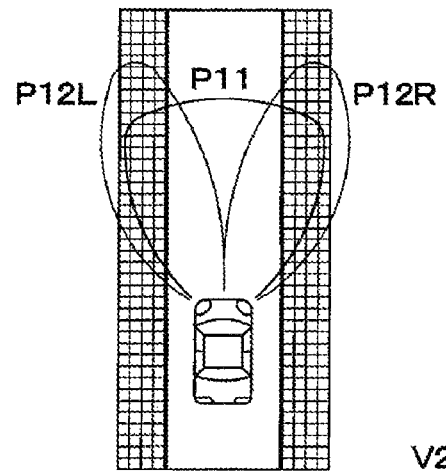
Figure 6C:
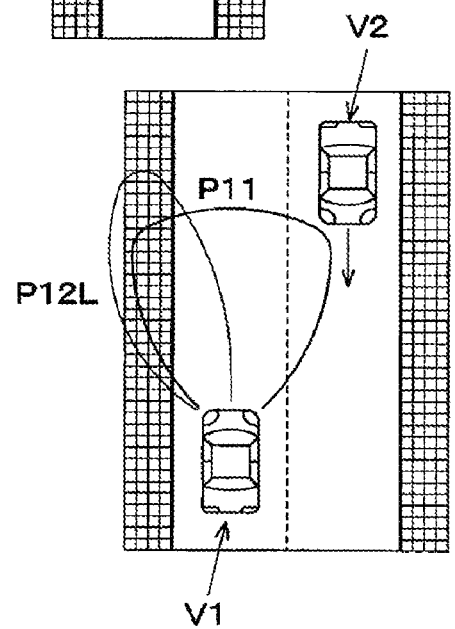

As illustrated in FIGS. 6A and 6B, the first additional light distribution patterns P12R, P12L of the left and right sides are formed to be more extended toward the forward area in the lateral sides of the vehicle as compared to the basic light distribution pattern P11, and illuminate the left and right side areas rather than the central area. As illustrated in FIG. 6C, when the right camera 14R of the vehicle V1 picks up an image of an opposing vehicle V2 on the right lane, the right lamp ECU 23R turns OFF the first sub lamp unit 12R of the right side to remove the first additional light distribution pattern P12R of the right side, thereby forming a non-symmetric light distribution pattern as a whole. Therefore, the glare to the opposing vehicle V2 is prevented.

Figure 6D:
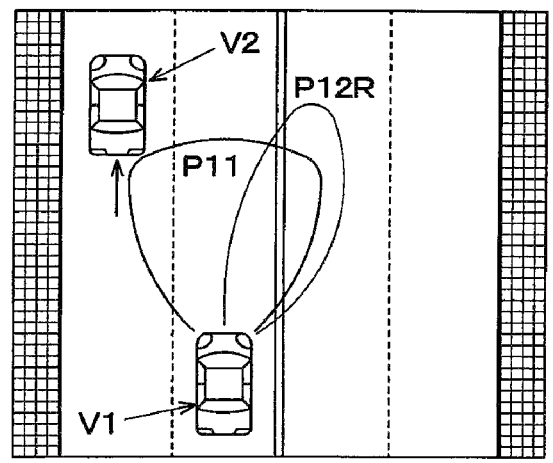
Figure 6E:
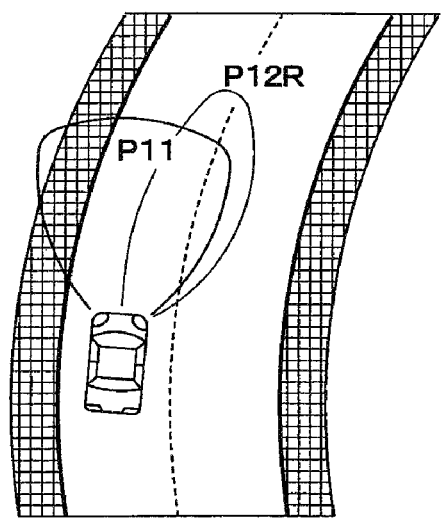

As illustrated in FIG. 6D, when the left camera 14L of the vehicle V1 picks up an image of a preceding vehicle V2 on the left lane, the left lamp ECU 23L turns OFF the first sub lamp unit 12L of the left side to remove the first additional light distribution pattern P12L of the left side, thereby forming a non-symmetric light distribution pattern as a whole. Therefore, the glare to the preceding vehicle V2 is prevented. As illustrated in FIG. 6E, when the right camera 14R picks up an image of a right curve of a road, the left lamp ECU 23L turns OFF the first sub lamp unit 12L of the left side, the right lamp ECU 23R turns ON the first sub lamp unit 12R of the right side, thereby calling a driver's attention to a right forward area by the first additional light distribution pattern P12R of the right side.

Figure 7A:
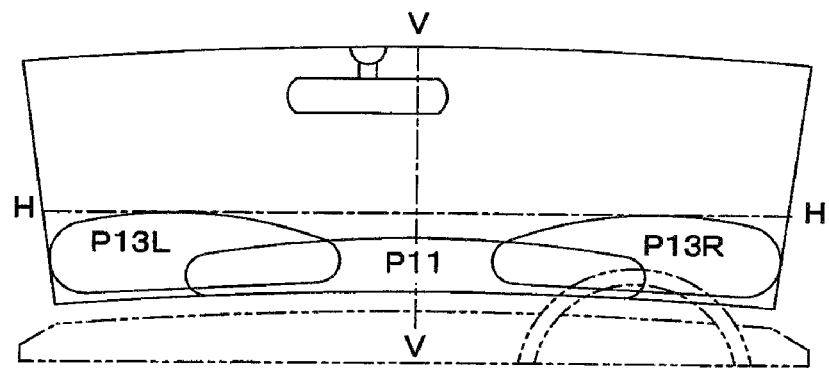
FIGS. 7A to 7D each schematically illustrates an operation of a second additional light distribution pattern.
Figure 7B:
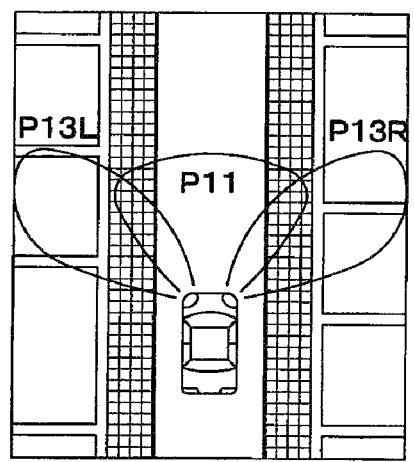

As illustrated in FIG. 7A, the second additional light distribution patterns P13R, P13L of the left and right sides are formed in the further lateral sides of the vehicle than the basic light distribution pattern P11 (in the lateral side of the vehicle than the first additional light distribution patterns P12R, P12L) to illuminate the outer areas in the horizontal direction. As illustrated in FIG. 7B, when a vehicle runs on a bright town at a low speed even at night, the basic light distribution pattern P11 is contracted and is combined with the second additional light distribution patterns P13R, P13L in the left and right sides, and thus, a driver can be prepared for a case where a pedestrian suddenly comes out of the left and right sidewalks.

Figure 7C:
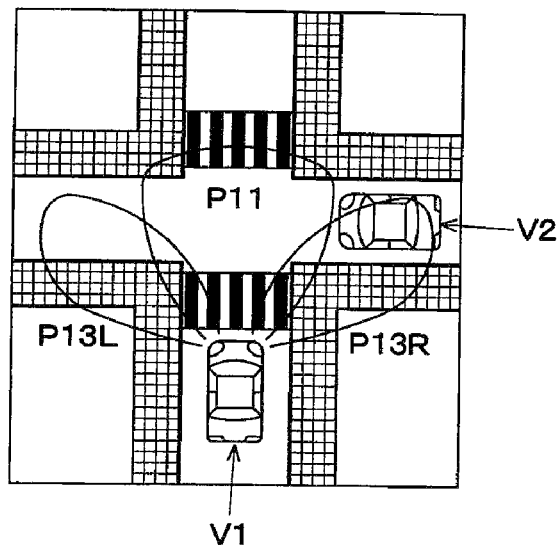
Figure 7D:
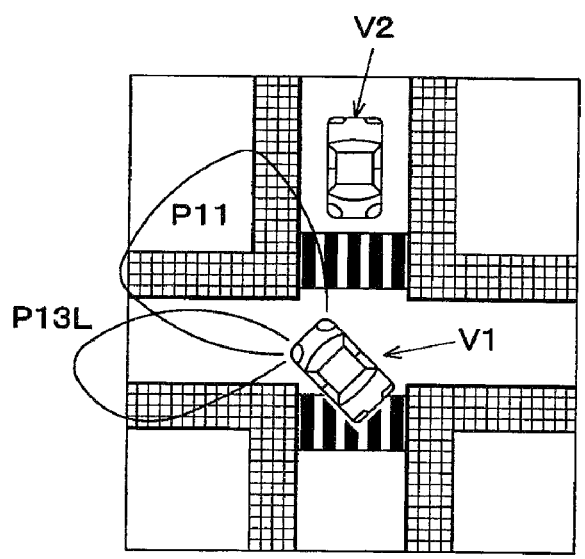
Figure 8A:
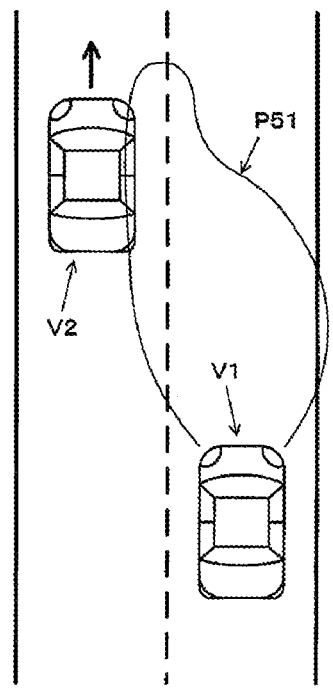
FIGS. 8A and 8B each schematically illustrates a problem of the conventional light distribution control system when viewed from above.
Figure 8B:
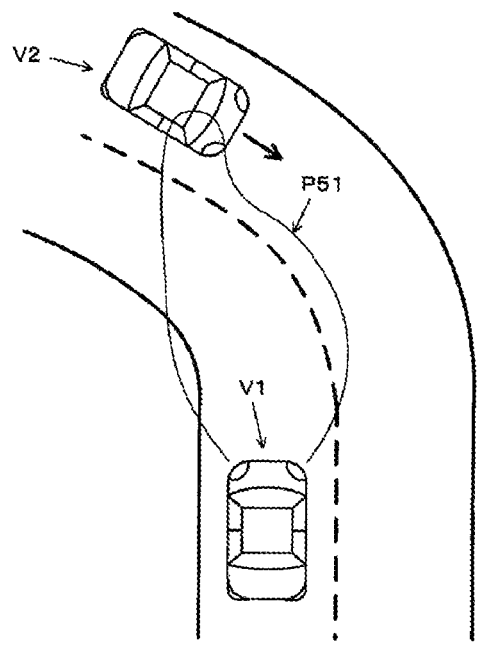

As illustrated in FIG. 7C, when the left and right cameras 14L, 14R pick up an image of a crosswalk in the forward area of a vehicle, the left and right lamp ECUs 23R, 23L turn ON the second sub lamp units 13R, 13L to form a symmetric light distribution pattern as a whole. Therefore, the left and right pedestrians or other vehicle V2 can be found early. As illustrated in FIG. 7D, when a vehicle turns around left at a crossroad, the second sub lamp unit 13L of the left side is turned ON and the second sub lamp unit 13R of the right side is turned OFF. Therefore, it is possible to illuminate the forward sidewalk brightly by a left and right non-symmetric light distribution pattern as a whole, and to prevent glare to an opposing vehicle V2 simultaneously.

The present disclosure is not limited to the exemplary embodiments as described above, and it is possible to adequately change the configuration of each of the parts within a range without departing from the spirit of the present disclosure. For example, the number of the additional light distribution patterns may be increased or decreased, or the shape of the additional light distribution pattern may be changed.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A light distribution control system for a vehicle comprising:
    a pair of head lamps disposed at a left side and a right side of a vehicle and configured to illuminate a forward area of the vehicle;
    a camera configured to pick up an image of the forward area of the vehicle; and
    a control unit that controls the light distribution of the head lamps based on image data of the camera,
    wherein, each of the pair of head lamps disposed at the left side and the right side of the vehicle is provided with a main lamp unit that forms a basic light distribution pattern, which is symmetrical, at the forward area of the vehicle, and a sub lamp unit that forms an additional light distribution pattern at a lateral side of the vehicle as compared to the basic light distribution pattern,
    each of the pair of headlamps is provided with a housing, and the camera, the control unit, the main lamp unit and the sub lamp unit are provided within the housing;
    the camera is provided in a chain line position to each of the main lamp units in a horizontal direction and configured to pick up an image of a forward area of the vehicle at an upper side of each of the main lamp units, and
    the control unit controls the light outputs of the sub lamp units disposed at the left side and the right side of the vehicle separately based on the image data of the camera.

2. The light distribution control system for a vehicle of claim 1, wherein the main lamp unit forms the basic light distribution pattern at a lower side than a horizontal line.

3. The light distribution control system for a vehicle of claim 1, wherein the camera includes a left camera that picks up an image of the left side of the forward area of the vehicle and a right camera that picks up an image of the right side of the forward area of the vehicle.

4. The light distribution control system for a vehicle of claim 2, wherein the camera includes a left camera that picks up an image of the left side of the forward area of the vehicle and a right camera that picks up an image of the right side of the forward area of the vehicle.

5. The light distribution control system for a vehicle of claim 3, wherein the left camera is provided inside the head lamp disposed at the left side of the vehicle, and the right camera is provided inside the head lamp disposed at the right side of the vehicle.

6. The light distribution control system for a vehicle of claim 4, wherein the left camera is provided inside the head lamp disposed at the left side of the vehicle, and the right camera is provided inside the head lamp disposed at the right side of the vehicle.

7. The light distribution control system for a vehicle of claim 5, wherein the control unit includes a left control unit that controls the sub lamp unit disposed at the left side of the vehicle based on the image data of the left camera and a right control unit that controls the sub lamp unit disposed at the right side of the vehicle based on the image data of the right camera, and each of the left and right control units is provided inside the head lamps disposed at the left side and the right side of the vehicle, respectively.

8. The light distribution control system for a vehicle of claim 6, wherein the control unit includes a left control unit that controls the sub lamp unit disposed at the left side of the vehicle based on the image data of the left camera and a right control unit that controls the sub lamp unit disposed at the right side of the vehicle based on the image data of the right camera, and each of the left and right control units is provided inside the head lamps disposed at the left side and the right side of the vehicle, respectively.

9. The light distribution control system for a vehicle of claim 1, wherein the sub lamp is formed with an LED and a projection lens.

* * * * *